US010367420B2

(12) United States Patent
Choudhary et al.

(10) Patent No.: US 10,367,420 B2
(45) Date of Patent: Jul. 30, 2019

(54) LOAD REGULATION FOR THE ISOLATED OUTPUT IN AN ISOLATED BUCK CONVERTER

(71) Applicant: Texas Instruments Incorporated, Dallas, TX (US)

(72) Inventors: Vijay N. Choudhary, Chandler, AZ (US); David Simon Baba, Phoenix, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 26 days.

(21) Appl. No.: 15/093,011

(22) Filed: Apr. 7, 2016

(65) Prior Publication Data

US 2017/0194868 A1 Jul. 6, 2017

Related U.S. Application Data

(60) Provisional application No. 62/273,745, filed on Dec. 31, 2015.

(51) Int. Cl.
*H02M 3/335* (2006.01)
(52) U.S. Cl.
CPC .... *H02M 3/33507* (2013.01); *H02M 3/33561* (2013.01)

(58) Field of Classification Search
CPC ..... H02M 3/33507; H02M 2001/0009; H02M 1/08
See application file for complete search history.

(56) References Cited

U.S. PATENT DOCUMENTS

| | | | | |
|---|---|---|---|---|
| 2003/0174520 A1* | 9/2003 | Bimbaud | ............ | H02M 3/3385 363/19 |
| 2006/0279965 A1* | 12/2006 | Nakamura | ............ | H02M 3/156 363/16 |
| 2008/0024100 A1* | 1/2008 | Huang | .................. | H02M 3/158 323/282 |

OTHER PUBLICATIONS

Texas Instruments, SNVA674B (AN-2292), Aug. 2012, Texas Instruments, B, 1-9.*
Texas Instruments, SNVS7831 (Datasgeets for LM5017), Jan. 2012, Texas Instruments, 1-9.*

* cited by examiner

*Primary Examiner* — Jue Zhang
(74) *Attorney, Agent, or Firm* — Charles A. Brill; Frank D. Cimino

(57) ABSTRACT

Methods and circuits for regulating the voltage of the isolated output of an isolated buck converter. Pursuant to a representative method, a parameter of the primary side of an isolated buck transformer is measured, wherein the parameter is dependent in part upon the output voltage on the secondary side of the transformer. The duty cycle of the isolated buck converter is set based at least in part on the value of the measured parameter.

12 Claims, 4 Drawing Sheets

LOAD REGULATION FOR THE ISOLATED OUTPUT IN AN ISOLATED BUCK CONVERTER

PRIORITY CLAIM

This application claims priority under 35 U.S.C. 119(e) to U.S. Provisional Patent Application 62/273,745, entitled "Load Regulation For The Isolated Output In A Flybuck Converter," filed Dec. 31, 2015, the entire contents of which are hereby expressly incorporated herein by reference.

BACKGROUND

In many applications, one or more low-cost, simple to use, isolated power supplies working from input voltages up to 100 volts are needed. Traditional solutions use flyback converters to generate this bias supply. Flyback designs typically utilize asymmetric transformer turn ratios for primary and secondary power windings, with an optocoupler and reference voltage, or an auxiliary winding for feedback regulation. Flyback converters require an elaborate compensation design to achieve stability. This results in a tedious design process and a bulky solution with a higher component count and cost.

Isolated buck converters, also known as Fly-Buck™ converters, combine a synchronous buck converter with coupled inductor windings to create isolated outputs. An isolated buck converter is created by replacing the output filter inductor of a synchronous buck converter with a coupled inductor, i.e., a flyback-type transformer, and rectifying the secondary winding voltage using a diode and a capacitor. FIG. 1 is a schematic circuit diagram representing an isolated buck converter. The isolated buck converter 100 of FIG. 1 includes a high-side transistor Q1 110, a low-side transistor Q2 115, a transformer 120 comprising a primary inductor winding 125 and a secondary inductor winding 130, a primary-side output capacitor $C_{out1}$ 135, a secondary rectifier diode 140, and a secondary-side output capacitor $C_{out2}$ 145. The duty cycle of the transistors Q1 110 and Q2 115 dictates the primary-side output voltage $V_{out1}$, and, in turn, the secondary-side output voltage $V_{out2}$. Feedback resistors $R_{FB1}$ 150 and $R_{FB2}$ 155 provide a feedback signal to a control circuit (not shown) that regulates the primary-side output voltage $V_{out1}$ by controlling the duty cycle of the transistors Q1 110 and Q2 115. Because the secondary-side output voltage $V_{out1}$ is related to the primary-side output voltage $V_{out1}$, this primary-side output voltage regulation also effects some degree of regulation of the secondary-side output voltage. However, due primarily to the leakage inductance of the primary-side inductor winding 125 and the secondary-side inductor winding 130 and the forward voltage drop of the rectifying diode 140, changes in the secondary-side output voltage $V_{out2}$ are not accurately reflected in the primary-side output voltage $V_{out1}$. Because the feedback loop only receives the primary-side output voltage information, the secondary-side voltage regulation degrades at lower input voltages $V_{in}$ and/or higher output currents $I_{out2}$. So, for example, voltage droop that occurs on the secondary side is not seen on the primary side, and is not taken into account by the control circuit in setting the duty cycles of Q1 and Q2. Additional factors also contribute to the degradation of the secondary-side voltage regulation at lower input voltages $V_{in}$ and/or higher output currents $I_{out2}$, such as the primary and secondary winding resistances.

SUMMARY

An illustrative aspect of this disclosure is directed to a method of regulating the voltage of the isolated output of an isolated buck converter that includes a transformer having a primary side and a secondary side. Pursuant to this method, a parameter of the primary side of the transformer is measured, wherein the parameter is dependent in part upon the output voltage on the secondary side of the transformer. The duty cycle of the isolated buck converter is set based at least in part on the value of the measured parameter.

Another illustrative aspect of this disclosure is directed to an isolated buck converter having a high-side transistor, a low-side transistor, a transformer, a current-measuring circuit, and a control circuit. The high-side transistor includes first, second, and third terminals, wherein a voltage level at the third terminal controls the flow of current from the first terminal to the second terminal. The first terminal is coupled to an input voltage. The low-side transistor also includes first, second, and third terminals, wherein a voltage level at the third terminal controls the flow of current from the first terminal to the second terminal. The first terminal of the low-side transistor is coupled to the second terminal of the high-side transistor and the second terminal of the low-side transistor is coupled to a ground. The transformer has a primary inductor winding and a secondary inductor winding. A first end of the primary inductor winding is coupled to the second terminal of the high-side transistor and the first terminal of the low-side transistor. A second end of the primary inductor winding is coupled to a first output node. A first end of the secondary inductor winding is coupled to a second output node through a diode, and a second end of the secondary inductor winding is coupled to a ground. The current-measuring circuit measures the current flowing through the high-side transistor. The control circuit receives a signal representative of the current flowing through the high-side transistor and sets the duty cycle of the high-side and low-side transistors based at least in part on said current.

Another illustrative aspect of this disclosure is directed to an isolated buck converter having a high-side transistor, a low-side transistor, a transformer, a current-measuring circuit, and a control circuit. The high-side transistor includes first, second, and third terminals, wherein a voltage level at the third terminal controls the flow of current from the first terminal to the second terminal. The first terminal is coupled to an input voltage. The low-side transistor also includes first, second, and third terminals, wherein a voltage level at the third terminal controls the flow of current from the first terminal to the second terminal. The first terminal of the low-side transistor is coupled to the second terminal of the high-side transistor and the second terminal of the low-side transistor is coupled to a ground. The transformer has a primary inductor winding and a secondary inductor winding. A first end of the primary inductor winding is coupled to the second terminal of the high-side transistor and the first terminal of the low-side transistor. A second end of the primary inductor winding is coupled to a first output node. A first end of the secondary inductor winding is coupled to a second output node through a diode, and a second end of the secondary inductor winding is coupled to a ground. The current-measuring circuit measures the current flowing through the low-side transistor. The control circuit receives a signal representative of the current flowing through the low-side transistor and sets the duty cycle of the high-side and low-side transistors based at least in part on said current.

DETAILED DESCRIPTION

Figure 1:
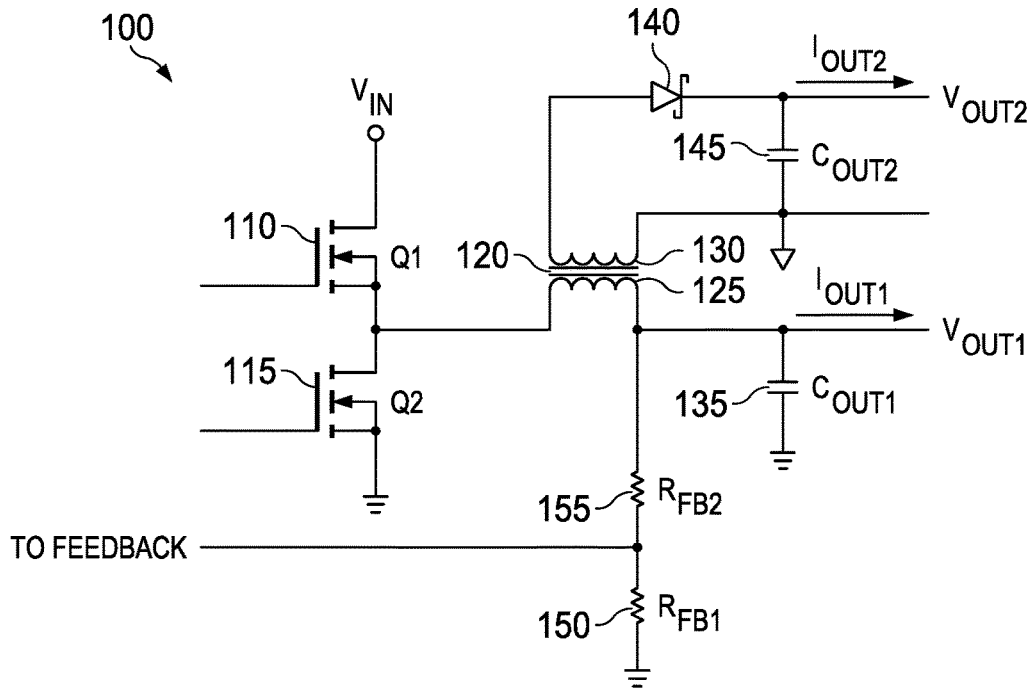
FIG. 1 is a schematic circuit diagram representing a prior art isolated buck converter.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Illustrative aspects of the present disclosure are directed generally toward reducing variation of voltage seen in the secondary side of an isolated buck converter as a result of the primary-side output being unloaded while the isolated secondary-side output is loaded. In illustrative embodiments, this voltage regulation is achieved by measuring a parameter on the primary side of an isolated buck converter, said parameter being representative of the secondary-side output voltage or secondary-side load current, and adjusting the duty cycle of the isolated buck converter by an amount in proportion to the measured parameter.

Figure 2:
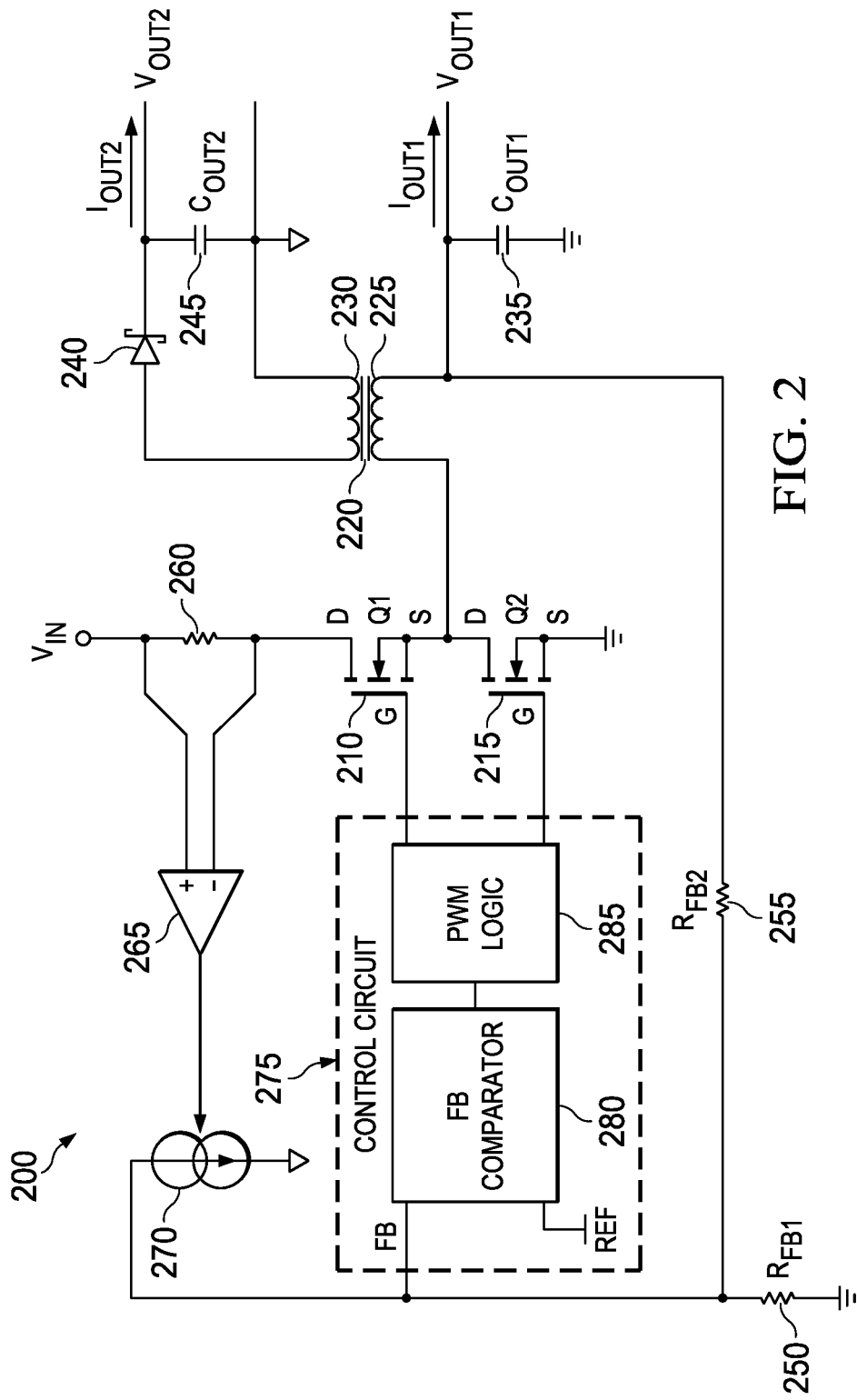
FIG. 2 is a schematic diagram of an isolated buck converter wherein the duty cycle of the isolated buck converter is set based in part on the measured current through the high-side transistor.

FIG. 2 is a schematic diagram of an isolated buck converter wherein the duty cycle of the isolated buck converter is set based in part on the measured current through the high-side transistor. The isolated buck converter 200 of FIG. 2 includes a high-side transistor Q1 210, a low-side transistor Q2 215, a transformer 220 comprising a primary inductor winding 225 and a secondary inductor winding 230, a primary-side output capacitor $C_{out1}$ 235, a secondary rectifier diode 240, and a secondary-side output capacitor $C_{out2}$ 245. The duty cycle of the transistors Q1 210 and Q2 215 dictates the primary-side output voltage $V_{out1}$, and, in turn, the secondary-side output voltage $V_{out2}$. In illustrative embodiments, the transistors Q1 210 and Q2 215 are field-effect transistors (FETs) such as metal-oxide semiconductor field-effect transistors (MOSFETs), but other types of transistors can be used as well. Feedback resistors $R_{FB1}$ 250 and $R_{FB2}$ 255 provide a feedback signal to a control circuit 275 that regulates the primary-side output voltage $V_{out1}$ by controlling the duty cycle of the transistors Q1 210 and Q2 215.

Because the current seen in the high-side transistor Q1 210 is proportional to the secondary-side output current $I_{out2}$, the measured current through the high-side transistor Q1 210 can be used to regulate the secondary-side output voltage $V_{out2}$. In the illustrative isolated buck converter of FIG. 2, the secondary-side output voltage $V_{out2}$ is regulated by measuring the current through the high-side transistor Q1 210 and setting the duty cycle of the transistors Q1 210 and Q2 215 based in part on the measured current. This reduces the variation of voltage seen in the secondary side of the isolated buck converter 200 that would otherwise occur due to the fact that variations in the secondary-side output voltage $V_{out2}$ are not fully reflected in the primary-side output voltage $V_{out1}$. FIG. 2 represents an illustrative implementation of measuring the current through the high-side transistor Q1 210 and setting the duty cycle of the transistors Q1 210 and Q2 215 based in part thereon. It is to be understood that many alternative schemes of sensing the current through the high-side transistor Q1 210 and adjusting the duty cycle based the sensed current are possible and that the present disclosure is in no way limited to the specific scheme represented in FIG. 2. In the illustrative embodiment represented by FIG. 2, a resistor 260 is coupled between the input voltage $V_{in}$ and the drain of n-channel MOSFET 210. The inputs of a differential amplifier 265 are coupled to either end of the resistor 260. Thus, the output of the differential amplifier 265 is representative of the difference between the input voltage $V_{in}$ and the drain voltage $V_d$ of transistor Q1 210, and, as such, is proportional to the current through the resistor 260 and, in turn, the drain-source current $I_{ds}$ of transistor Q1 210. This output of differential amplifier 265 is used by a control circuit 275 in determining the duty cycle of the transistors Q1 210 and Q2 215. In the illustrative embodiment of FIG. 2, this is implemented by providing the output of the differential amplifier 265 to a voltage controlled current source 270. Feedback resistor $R_{FB1}$ 250 is coupled between the voltage-controlled current source 270 and ground. The voltage across the feedback resistor $R_{FB1}$ 250 is provided to a feedback comparator 280 of the control circuit 275. Thus the signal provided to the feedback comparator 280 is representative, at least in part, of the current through the resistor 260 and, in turn, through the high-side transistor Q1 210.

In the illustrative isolated buck converter of FIG. 2, a second feedback resistor RFB2 255 is coupled between the feedback input FB of the feedback comparator 280 and the primary-side output Vout1 of the isolated buck converter 200. Thus the feedback input FB of the feedback comparator 280 is based on both the drain-source current Ids through the high-side transistor Q1 210 and the primary-side output voltage Vout1 of the isolated buck converter 200. The feedback comparator 280 compares the feedback input FB to a reference voltage that corresponds, at least in part, to a desired level of current though the high-side transistor Q1 210. In the illustrative embodiment of FIG. 2, the reference voltage also corresponds to a desired primary-side output voltage Vout1. The feedback comparator 280 compares the feedback signal FB to the reference voltage and provides an error signal representative of the difference between the feedback signal FB and the reference voltage (REF) to pulse-width modulation (PWM) logic 285. Based on the value of the error signal, the PWM logic 285 generates gate driver signals for the high-side transistor Q1 210 and the low-side transistor Q2 215. The PWM logic 285 sets the duty cycles of the gate driver signals such that the value of the feedback signal FB will be as close as possible to the desired value as represented by the reference voltage. Thus, the PWM logic 285 sets the duty cycles of the gate driver signals so as to adjust the drain-source current Ids through the high-side transistor Q1 210 such that the output voltage Vout1 will be as close as possible to a desired value. The amount of duty cycle variation can be adjusted or "tuned" by the designer to meet specific system accuracy needs. It is to be understood that the control scheme depicted in FIG. 2 is merely illustrative and that aspects of the present disclosure can be implemented in conjunction with substantially any control scheme, including but not limited to both current mode control and voltage mode control.

Figure 3:
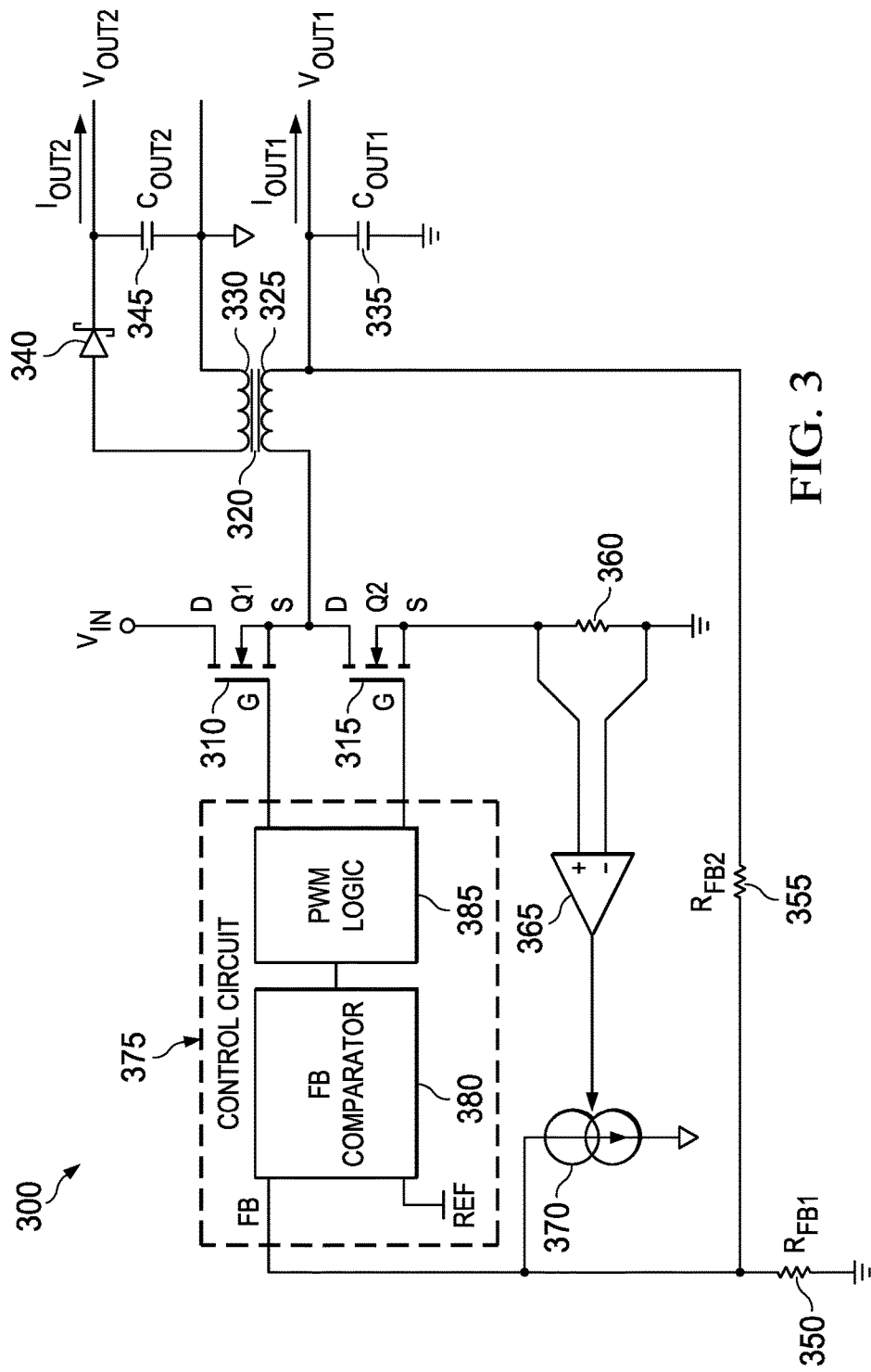
FIG. 3 is a schematic diagram of an isolated buck converter wherein the duty cycle of the isolated buck converter is set based in part on the measured current through the low-side transistor.

FIG. 3 is a schematic diagram of an isolated buck converter wherein the duty cycle of the isolated buck converter is set based in part on the measured current through the low-side transistor. The isolated buck converter 300 of FIG. 3 includes a high-side transistor Q1 310, a low-side transistor Q2 315, a transformer 320 comprising a primary inductor winding 325 and a secondary inductor winding 330, a primary-side output capacitor $C_{out1}$ 335, a secondary rectifier diode 340, and a secondary-side output capacitor $C_{out2}$ 345. The duty cycle of the transistors Q1 310 and Q2 315 dictates the primary-side output voltage $V_{out1}$, and, in turn, the secondary-side output voltage $V_{out2}$. In illustrative embodiments, the transistors Q1 310 and Q2 315 are field-effect transistors (FETs) such as metal-oxide semiconductor field-effect transistors (MOSFETs), but other types of transistors can be used as well. Feedback resistors $R_{FB1}$ 350 and $R_{FB2}$ 355 provide a feedback signal to a control circuit 375 that regulates the primary-side output voltage $V_{out1}$ by controlling the duty cycle of the transistors Q1 310 and Q2 315.

Because the current seen in the low-side transistor Q2 315 is directly proportional to the secondary-side output current $I_{out2}$, the measured current through the low-side transistor Q2 315 can be used to regulate the secondary-side output voltage $V_{out2}$. In the illustrative isolated buck converter of FIG. 3, the secondary-side output voltage $V_{out2}$ is regulated by measuring the current through the low-side transistor Q2 315 and setting the duty cycle of the transistors Q1 310 and Q2 315 based in part on the measured current. This reduces the variation of voltage seen in the secondary side of the isolated buck converter 300 that would otherwise occur due to the fact that variations in the secondary-side output voltage $V_{out2}$ are not fully reflected in the primary-side output voltage $V_{out1}$. FIG. 3 represents an illustrative implementation of measuring the current through the low-side transistor Q2 315 and setting the duty cycle of the transistors Q1 310 and Q2 315 based in part thereon. It is to be understood that many alternative schemes of sensing the current through the low-side transistor Q2 315 and adjusting the duty cycle based the sensed current are possible and that the present disclosure is in no way limited to the specific scheme represented in FIG. 3. In the illustrative embodiment represented by FIG. 3, a resistor 360 is coupled between the source of n-channel MOSFET 315 and ground. The inputs of a differential amplifier 365 are coupled to either end of the resistor 360. Thus, the output of the differential amplifier 365 is representative of the difference between the source voltage $V_s$ of transistor Q2 315 and the ground voltage, and, as such, is proportional to the current through the resistor 360 and, in turn, the drain-source current $I_{ds}$ of transistor Q2 315. This output of differential amplifier 365 is used by a control circuit 375 in determining the duty cycle of the transistors Q1 310 and Q2 315. In the illustrative embodiment of FIG. 3, this is implemented by providing the output of the differential amplifier 365 to a voltage controlled current source 370. Feedback resistor $R_{FB1}$ 350 is coupled between the voltage-controlled current source 370 and ground. The voltage across the feedback resistor $R_{FB1}$ 350 is provided to a feedback comparator 380 of the control circuit 375. Thus the signal provided to the feedback comparator 380 is representative, at least in part, of the current through the resistor 360 and, in turn, through the low-side transistor Q2 315.

In the illustrative isolated buck converter of FIG. 3, a second feedback resistor $R_{FB2}$ 355 is coupled between the feedback input FB of the feedback comparator 380 and the primary-side output $V_{out1}$ of the isolated buck converter 300. Thus the feedback input FB to the feedback comparator 380 is based on both the drain-source current $I_{ds}$ through the low-side transistor Q2 315 and the primary-side output voltage $V_{out1}$ of the isolated buck comparator 300. The feedback comparator 380 compares the feedback input FB to a reference voltage (REF) that corresponds, at least in part, to a desired level of current though the low-side transistor Q2 315. In the illustrative embodiment of FIG. 3, the reference voltage also corresponds to a desired primary-side output voltage $V_{out1}$. The feedback comparator 380 compares the feedback signal FB to the reference voltage and provides an error signal representative of the difference between the feedback signal FB and the reference voltage to pulse-width modulation (PWM) logic 385. Based on the value of the error signal, the PWM logic 385 generates gate driver signals for the high-side transistor Q1 310 and the low-side transistor Q2 315. The PWM logic 385 sets the duty cycles of the gate driver signals such that the value of the feedback signal FB will be as close as possible to the desired value as represented by the reference voltage. Thus, the PWM logic 385 sets the duty cycles of the gate driver signals such that the drain-source current $I_{ds}$ through the low-side transistor 315 will be as close as possible to a desired value. The amount of duty cycle variation can be adjusted or "tuned" by the designer to meet specific system accuracy needs. It is to be understood that the control scheme depicted in FIG. 3 is merely illustrative and that aspects of the present disclosure can be implemented in conjunction with substantially any control scheme, including but not limited to both current mode control and voltage mode control.

Figure 4:
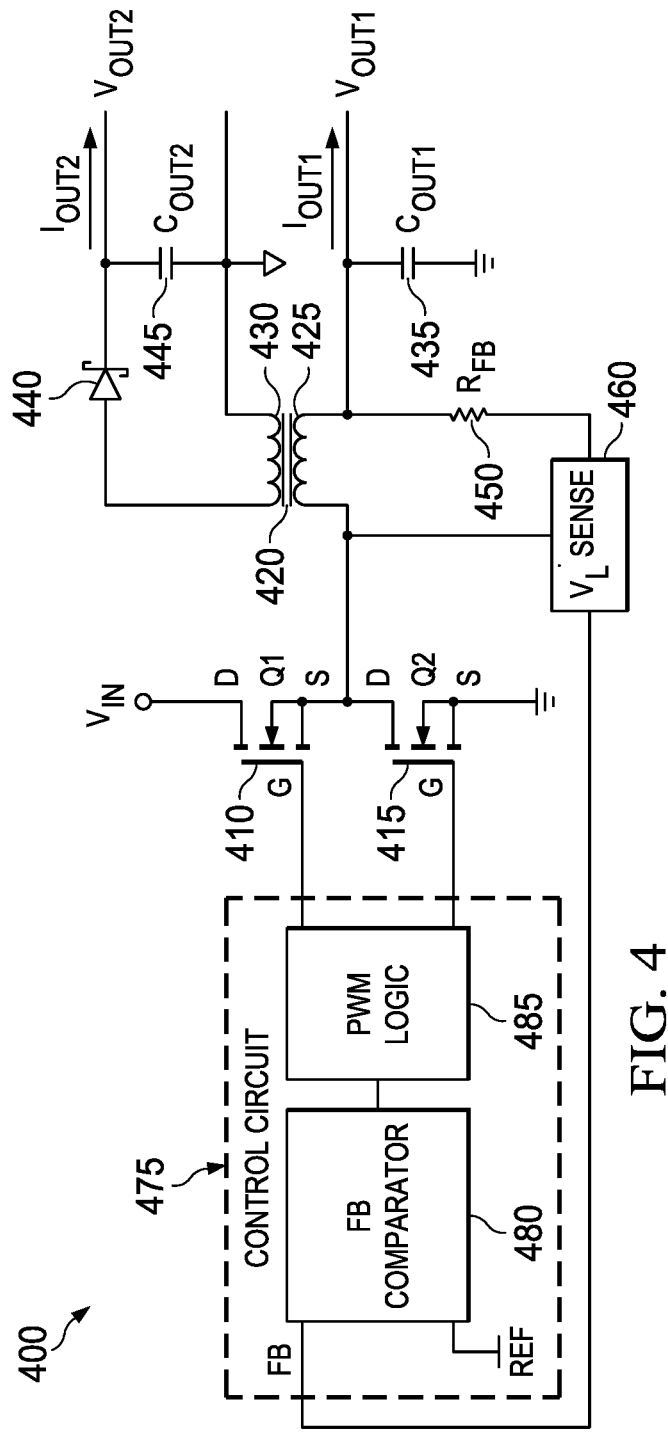
FIG. 4 is a schematic diagram of an isolated buck converter wherein the duty cycle of the isolated buck converter is set based in part on the measured primary inductor voltage.

FIG. 4 is a schematic diagram of an isolated buck converter wherein the duty cycle of the isolated buck converter is set based in part on the measured primary inductor voltage. The isolated buck converter 400 of FIG. 4 includes a high-side transistor Q1 410, a low-side transistor Q2 415, a transformer 420 comprising a primary inductor winding 425 and a secondary inductor winding 430, a primary-side output capacitor $C_{out1}$ 435, a secondary rectifier diode 440, and a secondary-side output capacitor $C_{out2}$ 445. In illustrative embodiments, the transistors Q1 410 and Q2 415 are field-effect transistors (FETs) such as metal-oxide semiconductor field-effect transistors (MOSFETs), but other types of transistors can be used as well.

Because the voltage $V_{L1}$ across the primary inductor winding 425 is directly proportional to the secondary inductor voltage $V_{L2}$, the measured voltage $V_{L1}$ can be used to regulate the secondary-side output voltage $V_{out2}$. In the illustrative isolated buck converter of FIG. 4, the secondary-side output voltage $V_{out2}$ is regulated by measuring the voltage $V_{L1}$ across the primary inductor winding 425 and setting the duty cycle of the transistors Q1 410 and Q2 415 based in part on the measured voltage. This reduces the variation of voltage seen in the secondary side of the isolated buck converter 400 that would otherwise occur due to the fact that variations in the secondary-side output voltage $V_{out2}$ are not fully reflected in the primary-side output voltage $V_{out1}$. FIG. 4 represents an illustrative implementation of measuring the primary inductor voltage $V_{L1}$ and setting the duty cycle of the transistors Q1 410 and 415 based in part thereon. It is to be understood that many alternative schemes of sensing the primary inductor voltage $V_{L1}$ and adjusting the duty cycle based on the sensed voltage are possible and that the present disclosure is in no way limited to the specific scheme represented in FIG. 4. In the illustrative embodiment represented by FIG. 4, the input end of the primary inductor winding 425 is coupled to a first input of an inductor voltage sensing circuit 460. The output end of the primary inductor winding 425 is coupled to a second input of the inductor voltage sensing circuit 460. In the illustrative embodiment represented by FIG. 4, the output end of the primary inductor winding 425 is coupled to the second input of the inductor voltage sensing circuit 460 via a feedback resistor $R_{FB}$ 450. The inductor voltage sensing circuit 460 measures the voltage $V_{L1}$ across the primary inductor winding 425 and provides a signal representative of the sensed voltage to a feedback comparator 480 of the control circuit 475.

The feedback comparator 480 compares the sensed primary inductor voltage $V_{L1}$ to a reference voltage that corresponds to a desired level of $V_{L1}$. The feedback comparator 480 provides an error signal representative of the difference between the sensed primary inductor voltage $V_{L1}$ and the reference voltage to pulse-width modulation (PWM) logic 485. Based on the value of the error signal, the PWM logic 485 generates gate driver signals for the high-side transistor Q1 410 and the low-side transistor Q2 415. The PWM logic 485 sets the duty cycles of the gate driver signals such that the value of the primary inductor voltage $V_{L1}$ will be as close as possible to the desired value as represented by the reference voltage. The amount of duty cycle variation can be adjusted or "tuned" by the designer to meet specific system accuracy needs. It is to be understood that the control scheme depicted in FIG. 4 is merely illustrative and that aspects of the present disclosure can be implemented in conjunction with substantially any control scheme, including but not limited to both current mode control and voltage mode control.

In another embodiment of the present disclosure, the duty cycle of the isolated buck converter is set based in part on the measured primary inductor current. Because the current $I_{L1}$ through the primary inductor winding 425 is representative of the primary and secondary current, the measured current $I_{L1}$ can be used to regulate the secondary-side current and output voltage $V_{out2}$. Thus, in this embodiment, the secondary-side output voltage $V_{out2}$ is regulated by measuring the current $I_{L1}$ through the primary inductor winding 425 and setting the duty cycle of the transistors Q1 410 and Q2 415 based in part on the measured current $I_{L1}$. This reduces the variation of voltage seen in the secondary side of the isolated buck converter 400 that would otherwise occur due to the fact that variations in the secondary-side output voltage $V_{out2}$ are not fully reflected in the primary-side output voltage $V_{out1}$.

Figure 5:
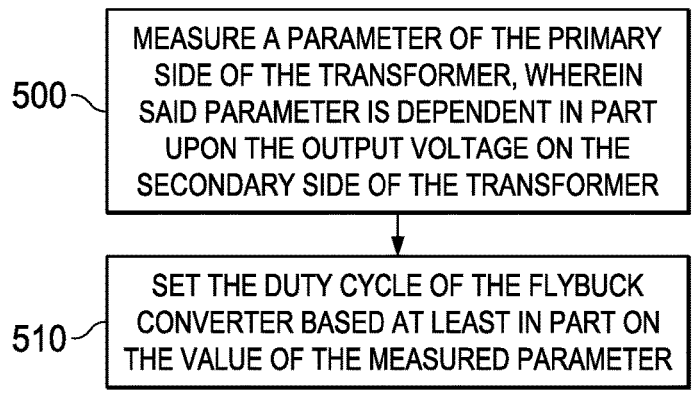
FIG. 5 is a flowchart representing a method of regulating the voltage of the isolated output of an isolated buck converter.

FIG. 5 is a flowchart representing a method of regulating the voltage of the isolated output of an isolated buck converter that includes a transformer having a primary side and a secondary side. At block 500, a parameter of the primary side of the transformer is measured, wherein the parameter is dependent in part upon the output voltage on the secondary side of the transformer. At block 510, the duty cycle of the isolated buck converter is set based at least in part on the value of the measured parameter.

It is noted that the embodiments disclosed herein are illustrative rather than limiting in nature and that a wide range of variations, modifications, changes, and substitutions are contemplated in the foregoing disclosure. Furthermore, in some instances, some features may be employed without a corresponding use of the other features. Accordingly, it is appropriate that the appended claims be construed broadly and in a manner consistent with the broad inventive concepts disclosed herein.

What is claimed is:

1. An isolated buck converter comprising:
a high-side transistor comprising first, second, and third terminals, wherein a voltage level at the third terminal controls the flow of current from the first terminal to the second terminal, and wherein the first terminal is coupled to a voltage input;
a low-side transistor comprising first, second, and third terminals, wherein a voltage level at the third terminal controls the flow of current from the first terminal to the second terminal, wherein the first terminal is coupled to the second terminal of the high-side transistor and the second terminal is coupled to a reference potential;
a transformer comprising:
  a primary inductor winding having a first end coupled to the second terminal of the high-side transistor and the first terminal of the low-side transistor, and a second end coupled to a first output node of the converter; and
  a secondary inductor winding having a first end coupled to a second output node of the converter, and a second end coupled to a reference potential;
a current sensing circuit operable to sense the current flowing through the high-side transistor; and
a control circuit operable to receive a signal representative of the current flowing through the high-side transistor and operable to set the duty cycle of the high-side and low-side transistors based on said signal representative of said current, the control circuit also receiving a feedback signal from the first output node coupled to only the primary inductor winding, the control circuit operable to use a combination of both the signal representative of the current and the feedback signal to control operation of the high-side and low-side transistors regulating voltage at the second output node of the converter, the current sensing circuit comprising:
  an impedance coupled between the voltage input and the first terminal of the high-side transistor; and
a differential amplifier comprising a first input electrically coupled to a first end of the impedance and a second input electrically coupled to a second end of the impedance, and operable to generate an output representative of the difference between the voltage values at the first and second inputs.

2. The isolated buck converter of claim 1 wherein said control circuit comprises:
a comparator operable to receive a signal having a value that is based on the amount of current flowing through the high-side transistor and to compare said signal to a reference voltage, and operable to generate an error signal representative of the difference between the received signal and the reference voltage; and
a pulse width modulation circuit operable to receive the error signal and to provide control signals to the third terminal of the high-side transistor and the third terminal of the low-side transistor, wherein the pulse width modulation circuit is operable to set the duty cycle of said control signals based on the value of said error signal.

3. The isolated buck converter of claim 2, further comprising:
a voltage-controlled current source operable to receive the output of the differential amplifier and to generate current at a level proportional to the voltage level of the differential amplifier output; and at least one feedback resistor coupled between the voltage-controlled current source and ground, wherein a voltage across the at least one feedback resistor is provided to the comparator for comparing to said reference voltage.

4. The isolated buck converter of claim 1 wherein said control circuit is operable to also receive a feedback signal representative of the voltage at the first output node, and wherein the control circuit is operable to set the duty cycle of the high-side and low-side transistors based on both the current flowing through the high-side transistor and the voltage at the first output node.

5. The isolated buck converter of claim 1 wherein the high-side transistor and the low-side transistor comprise field-effect transistors, and wherein the third terminal of the high-side transistor and the low-side transistor comprise the gate of said transistors.

6. An isolated buck converter comprising:
a high-side transistor comprising first, second, and third terminals, wherein a voltage level at the third terminal controls the flow of current from the first terminal to the second terminal, and wherein the first terminal is coupled to a voltage input;
a low-side transistor comprising first, second, and third terminals, wherein a voltage level at the third terminal controls the flow of current from the first terminal to the second terminal, wherein the first terminal is coupled to the second terminal of the high-side transistor and the second terminal is coupled to a reference potential;
a transformer comprising:
a primary inductor winding having a first end coupled to the second terminal of the high-side transistor and the first terminal of the low-side transistor, and a second end coupled to a first output node of the converter; and
a secondary inductor winding having a first end coupled to a second output node, and a second end coupled to a ground;
a current sensing circuit operable to sense the current flowing through the low-side transistor; and
a control circuit operable to receive a signal representative of the current flowing through the low-side transistor and operable to set the duty cycle of the high-side and low-side transistors based on the signal representative of the current, the control circuit receiving a voltage feedback signal from only the primary inductor winding to control the operation of the high-side and low-side transistors, and using both the current and the voltage feedback signal regulating voltage at the second output node of the converter, the current sensing circuit comprising:
an impedance coupled between the second terminal of the low-side transistor and a ground; and
a differential amplifier comprising a first input electrically coupled to a first end of the impedance and a second input electrically coupled to a second end of the impedance, and operable to generate an output representative of the difference between the voltage values at the first and second inputs.

7. The isolated buck converter of claim 6 wherein said control circuit comprises:
a comparator operable to receive a signal having a value that is based on the amount of current flowing through the low-side transistor and to compare said signal to a reference voltage, and operable to generate an error signal representative of the difference between the received signal and the reference voltage; and a pulse width modulation circuit operable to receive the error signal and to provide control signals to the third terminal of the high-side transistor and the third terminal of the low-side transistor, wherein the pulse width modulation circuit is operable to set the duty cycle of said control signals based on the value of said error signal.

8. The isolated buck converter of claim 7, further comprising:
a voltage-controlled current source operable to receive the output of the differential amplifier and to generate current at a level proportional to the voltage level of the differential amplifier output; and
at least one feedback resistor coupled between the voltage-controlled current source and ground, wherein a voltage across the at least one feedback resistor is provided to the comparator for comparing to said reference voltage.

9. The isolated buck converter of claim 6 wherein said control circuit is operable to also receive a feedback signal representative of the voltage at the first output node, and wherein the control circuit is operable to set the duty cycle of the high-side and low-side transistors based on both the current flowing through the low-side transistor and the voltage at the first output node.

10. The isolated buck converter of claim 6 wherein the high-side transistor and the low-side transistor comprise field-effect transistors, and wherein the third terminals of the high-side transistor and the low-side transistor comprise the gates of said transistors.

11. A controller circuit for regulating output voltage of the isolated output of an isolated buck converter comprising a transformer having a primary side and a secondary side, the circuit comprising:
a controller circuit being couplable to a high-side transistor of said isolated buck converter, said high-side transistor comprising first, second, and third terminals, wherein a voltage level at the third terminal controls the flow of current from the first terminal to the second terminal, and wherein the first terminal being couplable to a voltage input of the isolated buck converter;
and couplable to a low-side transistor of said isolated buck converter, said low-side transistor comprising first, second, and third terminals, wherein a voltage level at the third terminal controls the flow of current from the first terminal to the second terminal, the first terminal being couplable to the second terminal of the high-side transistor and the second terminal is coupled to a ground;
a measurement circuit operable to receive a signal that is representative of the current flow through the low-side transistor of the primary side of the transformer and to determine a value of the received signal, the measurement circuit receiving a voltage feedback signal from an output of only the primary inductor winding to control the operation of the high-side and low-side transistors regulating voltage at second output node of the converter; and
a pulse width modulation circuit operable to set the duty cycle of the isolated buck converter based on the value of the received signal representative of the current and on the voltage feedback signal.

12. The circuit of claim 11 wherein the high-side transistor and the low-side transistor comprise field-effect transistors, wherein the third terminal of the high-side transistor and the low-side transistor comprise the gate of said transistors, and wherein the pulse width modulation circuit is operable to provide gate driver signals to the gates of the high-side transistor and the low-side transistor, and wherein the pulse width modulation circuit is operable to set the pulse width of said gate driver signals based on the value of said received signal.

* * * * *